Figures 1, 2:
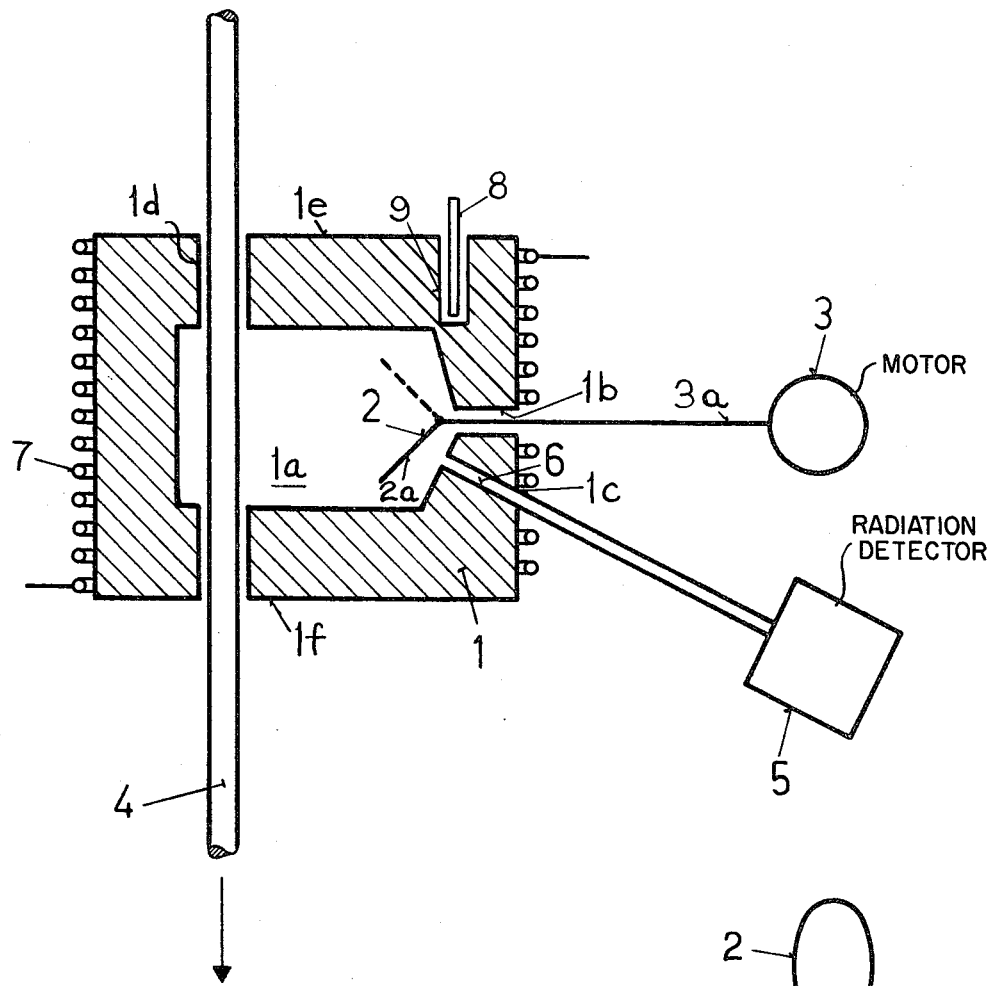

United States Patent [19]

Brandli et al.

[11] 3,884,075
[45] May 20, 1975

[54] APPARATUS FOR MEASURING SURFACE TEMPERATURES OF THIN ELONGATED OBJECTS BY INFRARED RADIATION THEREFROM

[75] Inventors: Gerold Brandli, Windisch; Pierre Keller, Baden, both of Switzerland

[73] Assignee: BBC Brown Boveri & Company Limited, Baden, Switzerland

[22] Filed: Mar. 11, 1974

[21] Appl. No.: 450,045

[30] Foreign Application Priority Data
Apr. 30, 1973 Switzerland.......................... 6095/73

[52] U.S. Cl. .......... 73/355 EM; 250/347; 250/351; 356/47; 356/48
[51] Int. Cl. ...... G01j 5/54; G01j 5/62; G01k 13/06
[58] Field of Search...73/355 R, 355 EM; 250/341, 250/347, 351; 356/43–48

[56] References Cited
UNITED STATES PATENTS

| | | | |
|---|---|---|---|
| 3,266,313 | 8/1966 | Litterst.............................. | 73/355 R |
| 3,392,282 | 7/1968 | Astheimer........................... | 250/351 |
| 3,430,492 | 3/1969 | Matsumoto et al.................. | 73/361 |
| 3,465,589 | 9/1969 | Flook.............................. | 73/355 R |
| 3,525,260 | 8/1970 | Kung................................ | 73/355 R |

Primary Examiner—Richard C. Queisser
Assistant Examiner—Frederick Shoon
Attorney, Agent, or Firm—Pierce, Scheffler & Parker

[57] ABSTRACT

Apparatus for measuring the temperature at the surface of thin elongated objects such as a metallic wire by measurement of the infrared radiation emitted from the surface of the object comprises a variably heated metallic compensating radiator provided with an opening through which the object passes and a rotatable chopper wheel interposed between the object surface and the compensating radiator. The side of the chopper wheel facing towards the compensating radiator is made radiation reflective and a radiation detector is positioned to receive in alternation the infrared radiation emitted from the surface of the object and which passes intermittently through the rotating chopper wheel and infrared radiation emitted by the compensating radiator and which is reflected intermittently into the detector from the reflective side of the chopper wheel. The detector produces at its output an alternating current signal determined by any temperature differential existing between the object and compensating radiator, and the heat supply to the compensating radiator is varied in accordance with the signal in such sense as to reduce the signal to zero whereby the temperature of the compensating radiator then equals the temperature of the object.

3 Claims, 2 Drawing Figures

APPARATUS FOR MEASURING SURFACE TEMPERATURES OF THIN ELONGATED OBJECTS BY INFRARED RADIATION THEREFROM

The present invention relates to an improved arrangement to measure and/or control the temperature of surfaces without physical contact and without limitation to the type of material, by means of infrared pyrometric measurement, whereby a radiative equilibrium is established between the object to be measured and a heated, compensating radiator, and is related to the subject matter of a pending United States application Ser. No. 380,572, filed July 19, 1973.

Usually, a temperature measurement at surfaces without physical contact will be of lesser precision than the direct contact method but will always be required in certain instances, for example, in case of a moving object or where the surface of an object must not be damaged. With the exception of the possibility to attach dyestuff, dielectric media and other foreign substances to the object and to observe their temperature-related characteristics from a distance, there remains practically only one method of such measurement, namely, the radiant pyrometric method. The thermal radiation which is being emitted by all bodies represents in principle a strong signal which is very informative which, however, cannot be utilized fully by the majority of the radiation pyrometers because the emission factor of the object to be measured and the surrounding radiation, reflected by it, influence the values obtained by such measurementS in a manner insufficiently known. In order to insure precise temperature measurements by use of thermal radiation, it is therefore important to keep away the surrounding radiation and to eliminate the emission factor by compensating radiation.

Several radiation pyrometers are known which utilize the above discussed principle. One of these devices compensates the radiation emitted by the object to be measured into black-body radiation by reflected radiation produced by a well-defined radiator. However, systems of this type are limited to objects with practically specular reflecting surfaces. In the case of another known pyrometer, a highly reflecting and integrating hemisphere is placed upon the object to be measured. However, difficulties will arise when smooth metal surfaces are being measured because the hemisphere does not reflect fully.

Finally, in the case of a third known apparatus, a blackened body is heated until the temperature gradient within the surface opposite the object to be measured disappears. The temperature is then determined by the thermometer in contact with the body. This arrangement has the disadvantage that it will act slowly time-wise, and that it will also respond to vertical air movements which often will interfere adversely.

The principal objective of the invention is to avoid and eliminate the disadvantages of the known measuring systems operating in accordance with the above discussed principle. The invention accomplishes this objective in the case of the abovediscussed method to measure the temperature by means of infrared pyrometry with a heated, compensating radiator in that there is arranged between radiator and object to be measured a revolving bladed chopper wheel, with a reflecting coating on one side, thusly that during the rotation of the chopper wheel and at the time intervals when the radiation from the object to be measured is allowed to pass through the gaps between the blades of the chopper wheel, this radiation is measured during its further path of travel by means of an infrared detector, while during the periods of time when said radiation is masked by a blade of the chopper wheel, these periods of time alternating with said time intervals, the radiation emitted by the compensating radiator is reflected by that surface of said blade which is facing away from the object to be measured and which is provided with the reflecting coating, and reach the infrared detector in place of the masked radiation from the object to be measured, with the result that in case of radiative non-equilibrium — that is a difference in temperature between object to be measured and radiator — an a.c. signal will be generated at the output of the infrared detector, its frequency being controlled by the speed of the chopper wheel; this signal is conducted, after phaseresponsive rectification, to a regulating device which will control the heat supply for the purpose of attaining the radiative equilibrium between object to be measured and radiator in such manner that the signal at the detector output becomes zero, thus indicating that the temperature, measured at the radiator, corresponds to the temperature of the object to be measured.

In the above-referred to pending application, Ser. No. 380,572 filed July 19, 1973, the configuration of the compensating radiator is particularly well suited for measurement of the temperature of an object having a large area. However, it often becomes necessary to measure the temperature at the surface of comparatively thin and elongated objects such as, for example, the surface temperature of a continuous length of wire which is run through the measuring point. For this purpose the compensating radiator in accordance with the present invention takes the form of a body having a substantially cylindrical configuration around which the heating coil is applied and which includes a cavity for accommodating the rotatable chopper wheel, and a throughbore extending between the opposite plane end faces of the cylinder and intersecting the cavity, and through which the thin elongated object whose surface temperature is to be measured e.g. a continuous length of wire, is passed.

A preferred embodiment of the compensating radiator structure suited particularly for measuring the surface temperature of thin elongated objects will now be described and is illustrated in the accompanying drawings wherein:

FIG. 1 is a somewhat diagrammatic presentation of the temperature measuring apparatus and with the cylindrical compensating radiator shown in diametral section; and FIG. 2 is a plan view of the chopper wheel 2, shown by FIG. 1.

With reference now to FIGS. 1 and 2 of the drawing; the compensating radiator consists of a cylindrical metallic body 1 which possesses a good thermal conductivity characteristic. A hollow space 1a provided within the cylindrical body 1 serves to accommodate a rotatable radiation chopper wheel 2 such as a three-bladed wheel shown in FIG. 2. The shaft 3a of this chopper wheel extends outwardly through a bore 1b in the body of the compensating radiator to a driving motor 3. The surface of the blades of the chopper 3 facing away from the wire 4 are provided with a reflecting coating 2a.

Within the body of the compensating radiator there is further provided a second bore 1c which extends from the cavity 1a to the outside at an acute angle to the bore 1b through which the driving shaft 3a for the chopper 2 extends. An infrared conductor pipe 6 inserted in the bore 1c serves to conduct infrared radiation to an infrared detector 5. A third bore 1d extends through the compensating radiator between the plane end faces 1e, 1f thereof. This bore 1d intersects, i.e. communicates with the hollow space 1a and provides a pass-through for the thin elongated object, e.g. a continuous wire 4 whose surface temperature is desired to be measured.

A heating coil 7 surrounds the periphery of the cylindrical compensating radiator 1 for heating the latter, its power supply being controlled by an electronic control circuit, known per se and therefore not illustrated here, which receives the output signal from the infrared detector 5 in the form of a controlling pulse. If desired, a contact thermometer 8 can be inserted into a blind hole 9 in the body of the compensating radiator 1.

During normal operations, that is for temperature measurements, the chopper wheel 2 rotates at a constant speed, whereby at the time intervals, during which the direct radiation emitted by the wire 4 can pass through the blade spacings, see FIG. 2, this radiation will reach the infrared detector 5 by way of the infrared conductor pipe 6 and generate an output signal with a certain amplitude. During the time periods alternating with these intervals, i.e. when the direct radiation is masked by the blades of the chopper wheel 2, the surfaces of the blades which are provided with a reflecting coating 2a on the side facing away from the wire 4 will cause the radiation, emitted by the interior surface of the radiator 1 and reflected by said blade coatings, to enter the infrared conductor pipe 6 and to arrive at the infrared detector 5 in place of the direct radiation. If there is no radiation equilibrium, that is if the temperatures of wire 4 to be measured and radiator 1 differ, the amplitudes of the detector output signal obviously will vary, depending on the radiation being received; either direct radiation from wire 4 or reflected radiation from radiator 1. With the exception of the d.c. component which is filtered out, there will appear across the detector output an a.c. signal, its phase differing by 180°, depending on the temperature of the radiator 1 which might be either higher or lower than the temperature of the wire 4 to be measured. This signal is rectified in relation to phase and is fed as a controlling pulse into the above discussed, not illustrated electronic device which regulates the current flowing through the heating coil 7 in accordance with the polarity of the controlling pulse (that is according to the phase of the detector output signal and thus the sign of the temperature difference between object and radiator as explained above) in such manner that the temperature of the radiator 1 is either discussed or reduced, if it is lower, or higher respectively, than the temperature of the wire 4, until the a.c. voltage signal across the detector output, and with it the controlling pulse, disappears. At this moment the radiation equilibrium, and thus the temperature uniformity between radiator 1 and wire 4 to be measured is attained, and the radiator temperature — which is now also the temperature of the wire — can be read from the contact thermometer 8.

The method proposed by the invention improves substantially the measurement of temperatures when compared with known pyrometric systems, and especially for objects with low emission factor temperatures ranging from room temperature to approximately 700° C.

We claim:

1. Apparatus for measuring the temperature at the surface of a relatively thin elongated object by measurement of the infrared radiation emitted from the surface thereof which comprises a compensating radiator constituted by a thermally conductive metallic body having a cavity therein, said metallic body including a bore therein communicating with said cavity and through which the elongated object is inserted into said cavity, a rotatable chopper wheel mounted for rotation within said cavity, an infrared radiation detector positioned to receive in alternation the infrared radiation emitted from the surface of the elongated object within said cavity and which passes intermittently through said rotating chopper wheel and infrared radiation emitted from the wall of said cavity and which is reflected intermittently into said detector by the side of said chopper wheel which faces away from the object within said cavity, said detector producing at its output a signal determined in accordance with the temperature differential existing between the portion of the elongated object within said cavity and said metallic body, and means for heating said metallic body in accordance with said signal in such sense as to reduce said signal to zero whereby the temperature of said metallic body then equals the temperature of the elongated object.

2. Apparatus as defined in claim 1 for measuring the surface temperature of a thin elongated object wherein said bore in said metallic body extends completely therethrough between its opposite end faces thereby enabling the thin elongated object to be passed completely through the body thereby bringing successive longitudinal surface portions thereof into communication with said cavity for measurement of its surface temperature.

3. Apparatus as defined in claim 1 for measuring the surface temperature of a thin elongated object wherein the means for heating said metallic body is constituted by a coil surrounding the periphery thereof, and wherein said bore in said metallic body extends completely therethrough between its opposite end faces thereby enabling the thin elongated object to be passed completely through the body so as to bring successive longitudinal surface portions thereof into communication with said cavity for measurement of its surface temperature.

* * * * *